US012101619B2

(12) United States Patent
Park et al.

(10) Patent No.: US 12,101,619 B2
(45) Date of Patent: Sep. 24, 2024

(54) SOUND TRACING METHOD AND DEVICE TO IMPROVE SOUND PROPAGATION PERFORMANCE

(71) Applicant: Exarion Inc., Seoul (KR)

(72) Inventors: Woo Chan Park, Seoul (KR); Ju Won Yun, Seoul (KR); Eun Jae Kim, Seoul (KR)

(73) Assignee: EXARION INC., Seoul (KR)

( * ) Notice: Subject to any disclaimer, the term of this patent is extended or adjusted under 35 U.S.C. 154(b) by 127 days.

(21) Appl. No.: 17/927,422

(22) PCT Filed: Apr. 22, 2021

(86) PCT No.: PCT/KR2021/005116
§ 371 (c)(1),
(2) Date: Nov. 23, 2022

(87) PCT Pub. No.: WO2022/191356
PCT Pub. Date: Sep. 15, 2022

(65) Prior Publication Data

US 2023/0199418 A1 Jun. 22, 2023

(30) Foreign Application Priority Data

Mar. 8, 2021 (KR) ........................ 10-2021-0029894
Mar. 8, 2021 (KR) ........................ 10-2021-0029939

(51) Int. Cl.
*H04S 7/00* (2006.01)
*H04S 3/00* (2006.01)

(52) U.S. Cl.
CPC ................ *H04S 7/30* (2013.01); *H04S 3/004* (2013.01)

(58) Field of Classification Search
CPC . H04S 7/30; H04S 3/004; H04S 7/305; H04S 7/301; H04S 2420/01
USPC ........................................................... 381/17
See application file for complete search history.

(56) References Cited

U.S. PATENT DOCUMENTS

2016/0034248 A1 2/2016 Schissler et al.
2018/0310113 A1* 10/2018 Ray ...................... G09B 21/006
2019/0261122 A1 8/2019 Ray et al.

FOREIGN PATENT DOCUMENTS

JP 2017-526264 A 9/2017
KR 10-1828908 B1 2/2018

OTHER PUBLICATIONS

International Search Report for PCT/KR2021/005116 mailed Dec. 1, 2021 from Korean Intellectual Property Office.

(Continued)

*Primary Examiner* — Paul Kim
(74) *Attorney, Agent, or Firm* — Paratus Law Group, PLLC

(57) ABSTRACT

There is provided a sound tracing method. The method includes: a setup processing step of setting ray information; a ray generation step of generating a sound ray; a traversal/intersection test step of generating hit triangle information; a propagation path validation (PPV) step of searching a sound path; a guide plane sort step of generating and sorting a guide plane; a Reverb Geometry Collect/Reverb Plane Sort (RGC/RPS) step of generating and sorting a reverb plane; and an impulse response calculation step of calculating an impulse response (IR) and storing the calculated IR in a valid path buffer.

17 Claims, 10 Drawing Sheets

(56) References Cited

OTHER PUBLICATIONS

Eunjae Kim et al., "Adaptive depth control algorithm for sound tracing", Journal of the Korea Computer Graphics Society, Dec. 1, 2018, pp. 21-30, vol. 24, No. 5.
Yejong Joo et al., "Cache simulation for measuring cache performance suitable for sound rendering", Journal of the Korea Computer Graphics Society, Jul. 2017, pp. 123-133, vol. 23, No. 3.

* cited by examiner

SOUND TRACING METHOD AND DEVICE TO IMPROVE SOUND PROPAGATION PERFORMANCE

CROSS-REFERENCE TO PRIOR APPLICATIONS

This application is a National Stage Patent Application of PCT International Patent Application No. PCT/KR2021/005116 (filed on Apr. 22, 2021) under 35 U.S.C. § 371, which claims priority to Korean Patent Application Nos. 10-2021-0029894 (filed on Mar. 8, 2021) and 10-2021-0029939 (filed on Mar. 8, 2021), which are all hereby incorporated by reference in their entirety.

BACKGROUND

The present invention relates to sound processing technology, and more particularly, to a sound tracing method and a sound tracing device to improve sound propagation performance by parallel execution of a reverb mode to calculate reverb and a sound path mode to calculate a sound path upon sound propagation processing.

Recently, with the development of mobile technology, graphics technology, and input/output technology of the senses, interest in virtual reality has been increasing rapidly. In order to support the realistic virtual reality environment, it is necessary to reproduce high-quality hearing spaces as well as the visual space reproduction through virtual space. In order to reproduce the auditive space sense, 3D sound technology using a multi-channel audio system or a head related transfer function (HRTF) can be used.

However, the multi-channel audio used to reproduce 3D sound requires a dedicated speaker system, and there are problems such as the need for space where the speaker system will be installed. Most of the 3D sound technology based on the head related transfer function uses a predetermined acoustic adjustment filter or reproduces a hearing space in a simple virtual space, such as a cuboid shoe box. Since the physical effects of the surrounding environment in the virtual space and the material of the material are not applied, this technology has a limit to reproducing realistic sound.

In order to solve these limitations, 3D sound technologies based on geometric methods or numeric methods have been published. Among the various methods of geometric methods, a method tracing of merging 3D graphics ray tracing technology and sound processing technology is called sound tracing. Sound tracing as a kind of sound rendering technique is a technique that generates a sound by tracing the sound propagation paths between a listener and a sound source.

Most sound tracing solutions are software-based solutions that are accelerated using CPUs and GPGPUs. Such solutions can be processed at an interactive rate only when CPUs or GPUs with the highest specifications are mounted. However, computing budgets assigned to audio in real applications, such as games, are very limited as the whole, so it is very difficult to perform sound tracing in real-time. In addition, since the mobile platform uses limited resources, it is almost impossible to apply solutions based on software.

CITATION LIST

Patent Document

Korean Patent Registration No. 10-1828908 (Feb. 7, 2018)

SUMMARY

An embodiment of the present invention has been made in an effort to provide a sound tracing method and a sound tracing device to improve sound propagation performance by parallel execution of a reverb mode to calculate a reverb and a sound path mode to calculate a sound path upon sound propagation processing.

An embodiment of the present invention has been made in an effort to provide a hardware friendly sound tracing method that can process a sound propagation path calculation having a largest calculation amount in real time in sound rendering.

An embodiment of the present invention has been made in an effort to design a hardware friendly algorithm that can process the sound propagation path calculation having the largest calculation amount in real time in sound rendering, and provide hardware architecture implemented based thereon as the sound tracing device.

Among embodiments, according to an embodiment of the present invention, there is provided a sound tracing method to improve sound propagation performance, which includes: a setup processing step of controlling a mode transition of a sound propagation unit (SPU) and setting ray information for generating a sound ray; a ray generation step of generating the sound ray by calculating an origin and a direction based on the ray information; a traversal/intersection test step of performing a traversal/intersection test on an acceleration structure (AS) based on the sound ray to generate hit triangle information; a propagation path validation (PPV) step of searching a sound path according to a mode of the sound propagation unit; a guide plane sort step of generating and sorting a guide plane based on the hit triangle information when the mode of the sound propagation unit is a guide mode; a Reverb Geometry Collect/Reverb Plane Sort (RGC/RPS) step of generating and sorting a reverb plane by tracking a reverb ray generated as the sound ray when the mode of the sound propagation unit is a reverb mode; and an impulse response calculation step of calculating an impulse response (IR) of the sound path or a reverb impulse response (IR) based on information received in the traversal/intersection test step or the reverb processing step, and storing the calculated IR or reverb IR in a valid path buffer.

The mode of the sound propagation unit may be transited to the reverb mode or a sound path mode from the guide mode, and the modes may be performed in parallel.

The sound path mode may be formed by sequentially concatenating a direct transmission mode and a reflection/diffraction mode.

The setup processing step may include a step of transferring any one of guide ray information and reverb ray information and reflection ray information received from the propagation path validation (PPV) step to the ray generation step as the ray information according to the mode of the sound propagation unit.

The ray generation step may include a step of generating the corresponding ray from a listener or a sound source based on the ray information by using a spherical sampling scheme when the mode of the sound propagation unit is the guide mode or the reverb mode.

The propagation path validation (PPV) step may include a step of determining valid direct/transmission, reflection, and diffraction paths through a propagation path test when the mode of the sound propagation unit is a sound path mode.

The propagation path validation (PPV) step may include a step of sequentially setting at least one listener mirror position symmetric to at least one setup plane based on a location of the listener or a listener mirror position, a step of shooting a validation ray toward a sound source from a listener mirror position set last, a step of determining a path up to the sound source from a setup plane as a valid path when the validation ray hits the setup plane used to set the listener mirror position, and a step of repeatedly performing the step of shooting the validation ray and the step of determining the valid path in a reverse order to a setting order of the at least one listener mirror position, and determining a valid reflection path repeatedly until the validation ray is shot at the location of the listener.

The guide plane sort step may include a step of generating one guide plane including triangles having the same normal information based on the hit triangle information.

The guide plane sort step may include a step of generating the guide plane based on the hit triangles and storing the generated guide plane in a plane buffer, and a step of sorting the guide plane of the plane buffer and removing redundancy.

The reverb processing step may include a step of generating valid reverb information based on the same planes by comparing plane IDs of the reverb plane and the guide plane.

Among embodiments, according to an embodiment of the present invention, there is provided a sound tracing device to improve sound propagation performance, which includes: a setup processing unit controlling a transition of an operation mode and setting ray information for generating a sound ray; a ray generation unit generating the sound ray by calculating an origin and a direction based on the ray information; a traversal/intersection unit of performing a traversal/intersection test on an acceleration structure (AS) based on the sound ray to generate hit triangle information; a propagation path validation (PPV) unit searching a sound path according to the operation mode; a guide plane sort unit generating and sorting a guide plane based on the hit triangle information when the operation mode is a guide mode; a Reverb Geometry Collect/Reverb Plane Sort (RGC/RPS) unit generating and sorting a reverb plane by tracking a reverb ray generated as the sound ray when the operation mode is a reverb mode; and an impulse response (IP) calculation unit calculating an impulse response (IR) of the sound path or a reverb impulse response (IR) based on information received from the traversal/intersection unit or the reverb processing unit, and storing the IR and the reverb IR in a valid path buffer.

The device may further include a plane buffer receiving plane information from the setup processing unit and generated by the guide plane sort unit or storing sorted planes.

The operation mode may be transited to the reverb mode or a sound path mode from the guide mode according to initiation of mode transition, in which the sound path mode may be formed by sequentially concatenating a direct transmission mode and a reflection/diffraction mode, and the reverb mode and the sound path mode may be performed in parallel.

The setup processing unit may generate a setup plane required for performing the reflection/diffraction mode through a plane setup operation.

The plane setup operation may include a plane select step of selecting any one of planes stored in a plane buffer and a next frame buffer, a plane type decision step of deciding whether the selected plane is a reflection plane or a diffraction plane, and a plane calculation step of performing a plane calculation according to the decided plane type to generate the setup plane.

The plane selection step may include a step of selecting the corresponding plane if the corresponding plane having the same information as the guide plane stored in the plane buffer is present in the next frame buffer and selecting the corresponding guide plane if not.

The plane type decision step may include a step of setting a guide plane normal according to a direction facing a listener for the selected plane, and a step of deciding the selected plane as the reflection plane when the guide plane normal faces a sound source, and deciding the selected plane as the diffraction plane in an opposite case.

The disclosed technology may have the following effects. However, since it is not meant that a particular embodiment should include all of the following effects or merely include the following effects, the scope of the disclosed technology is not to be construed as being limited thereby.

A sound tracing method and a sound tracing device according to an embodiment of the present invention can improve sound propagation performance by parallel execution of a reverb mode to calculate a reverb and a sound path mode to calculate a sound path upon sound propagation processing.

A sound tracing method and a sound tracing device to improve sound propagation performance according to an embodiment of the present invention are designed to be hardware-friendly to process a sound propagation path calculation having a largest calculation amount in real time in sound rendering.

The sound tracing method and the sound tracing device to improve sound propagation performance according to an embodiment of the present invention can implement hardware architecture based on an algorithm designed hardware-friendly in order to process the sound propagation path calculation having the largest calculation amount in real time in sound rendering.

DETAILED DESCRIPTION

Figure 1:
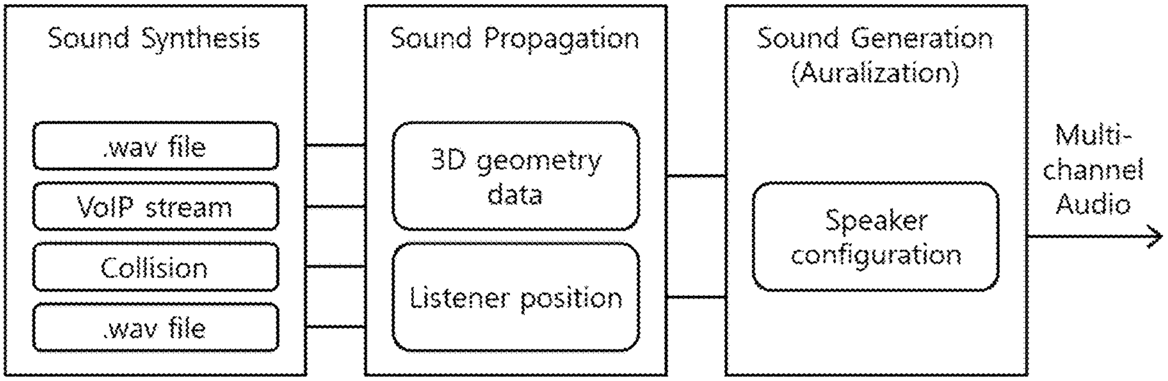
FIG. 1 is a diagram for describing a pipeline of sound tracing.

A description of the present invention is merely an embodiment for a structural or functional description and the scope of the present invention should not be construed as being limited by an embodiment described in a text. That is, since the embodiment can be variously changed and have various forms, the scope of the present invention should be understood to include equivalents capable of realizing the technical spirit. Further, it should be understood that since a specific embodiment should include all objects or effects or include only the effect, the scope of the present invention is limited by the object or effect.

Meanwhile, meanings of terms described in the present application should be understood as follows.

The terms "first," "second," and the like are used to differentiate a certain component from other components, but the scope of should not be construed to be limited by the terms. For example, a first component may be referred to as a second component, and similarly, the second component may be referred to as the first component.

It should be understood that, when it is described that a component is "connected to" another component, the component may be directly connected to another component or a third component may be present therebetween. In contrast, it should be understood that, when it is described that an element is "directly connected to" another element, it is understood that no element is present between the element and another element. Meanwhile, other expressions describing the relationship of the components, that is, expressions such as "between" and "directly between" or "adjacent to" and "directly adjacent to" should be similarly interpreted.

It is to be understood that the singular expression encompasses a plurality of expressions unless the context clearly dictates otherwise and it should be understood that term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In each step, reference numerals (e.g., a, b, c, etc.) are used for convenience of description, the reference numerals are not used to describe the order of the steps and unless otherwise stated, it may occur differently from the order specified. That is, the respective steps may be performed similarly to the specified order, performed substantially simultaneously, and performed in an opposite order.

The present invention can be implemented as a computer-readable code on a computer-readable recording medium and the computer-readable recording medium includes all types of recording devices for storing data that can be read by a computer system. Examples of the computer readable recording medium may include a ROM, a RAM, a CD-ROM, a magnetic tape, a floppy disk, an optical data storage device, and the like. Further, the computer readable recording media may be stored and executed as codes which may be distributed in the computer system connected through a network and read by a computer in a distribution method.

If it is not contrarily defined, all terms used herein have the same meanings as those generally understood by those skilled in the art. Terms which are defined in a generally used dictionary should be interpreted to have the same meaning as the meaning in the context of the related art, and are not interpreted as an ideal meaning or excessively formal meanings unless clearly defined in the present application.

FIG. 1 is a diagram for describing a pipeline of sound tracing.

Referring to FIG. 1, a sound tracing pipeline may be constituted by sound synthesis, sound propagation, and sound generation (auralization) steps. Among the sound tracing processing steps, the sound propagation step may correspond to a most important step of offering immersion to virtual reality and correspond to a step in which calculation complexity is high and a calculation time takes the longest. Further, real-time processing of sound tracing may depend on whether to accelerate this step.

The sound synthesis step may correspond to a step of generating a sound effect according to an interaction of users. For example, the sound synthesis may perform processing of a sound generated when the user taps a door or drops an object, and may correspond to a technique generally used in the existing game, a UI, etc.

The sound propagation step as a step of simulating a process in which a synthesized sound is transferred to a listener through the virtual reality may correspond to a step of processing acoustic features (a reflection coefficient, an absorption coefficient, etc.) and sound features (reflection, absorption, transmission, etc.) of the virtual reality based on a scheme geometric feature of the virtual reality.

The sound generation step may correspond to a step of regenerating an input sound based on a configuration of a listener speaker by using feature values (reflection/transmission/absorption coefficients, a distance attenuation feature, etc.) calculated in the sound propagation step.

Figure 2:
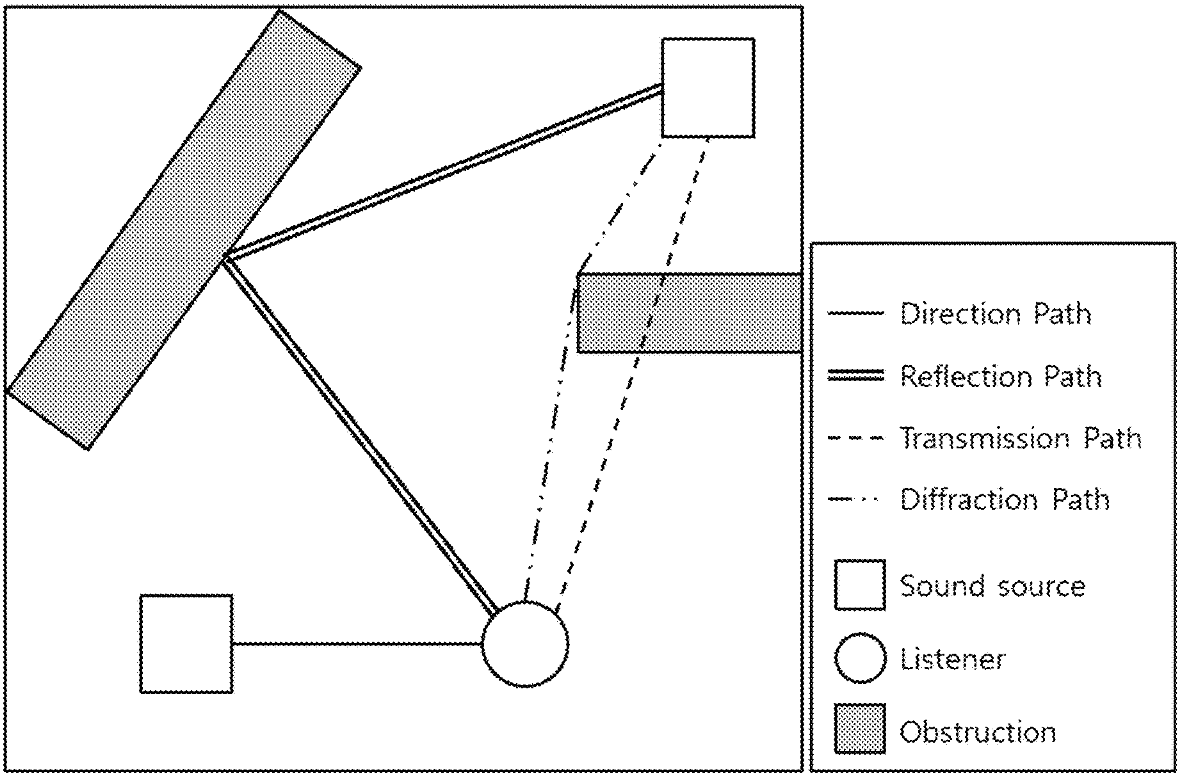
FIG. 2 is a diagram for describing the type of sound propagation path.

FIG. 2 is a diagram for describing the type of sound propagation path.

Referring to FIG. 2, a direct path may correspond to a path through which the sound is directly transferred between the listener and a sound source without any obstruction. A reflection path may correspond to a path in which the sound hits the obstruction, and then reaches the listener, and a transmission path may correspond to a path in which when there is the obstruction between the listener and the sound source, the sound transmits the obstruction and is transferred to the listener.

The sound tracing may shoot a ray at a location of each of multiple sound sources. Each shot ray may find an object having a geometric structure, which the ray hits, and generate a ray corresponding to reflection, transmission, and diffraction for the object which the ray hits. Such a process may be recursively repeatedly performed. The rays shot from the sound sources and the rays shot form the listener may meet each other, and a path in which the rays meet may be referred to as a sound propagation path. Consequently, the sound propagation path may mean a valid path in which the sound starting from the sound source location reaches the listener via the reflection, the transmission, the absorption, the diffraction, etc. A final sound may be calculated with the sound propagation paths.

Figure 3:
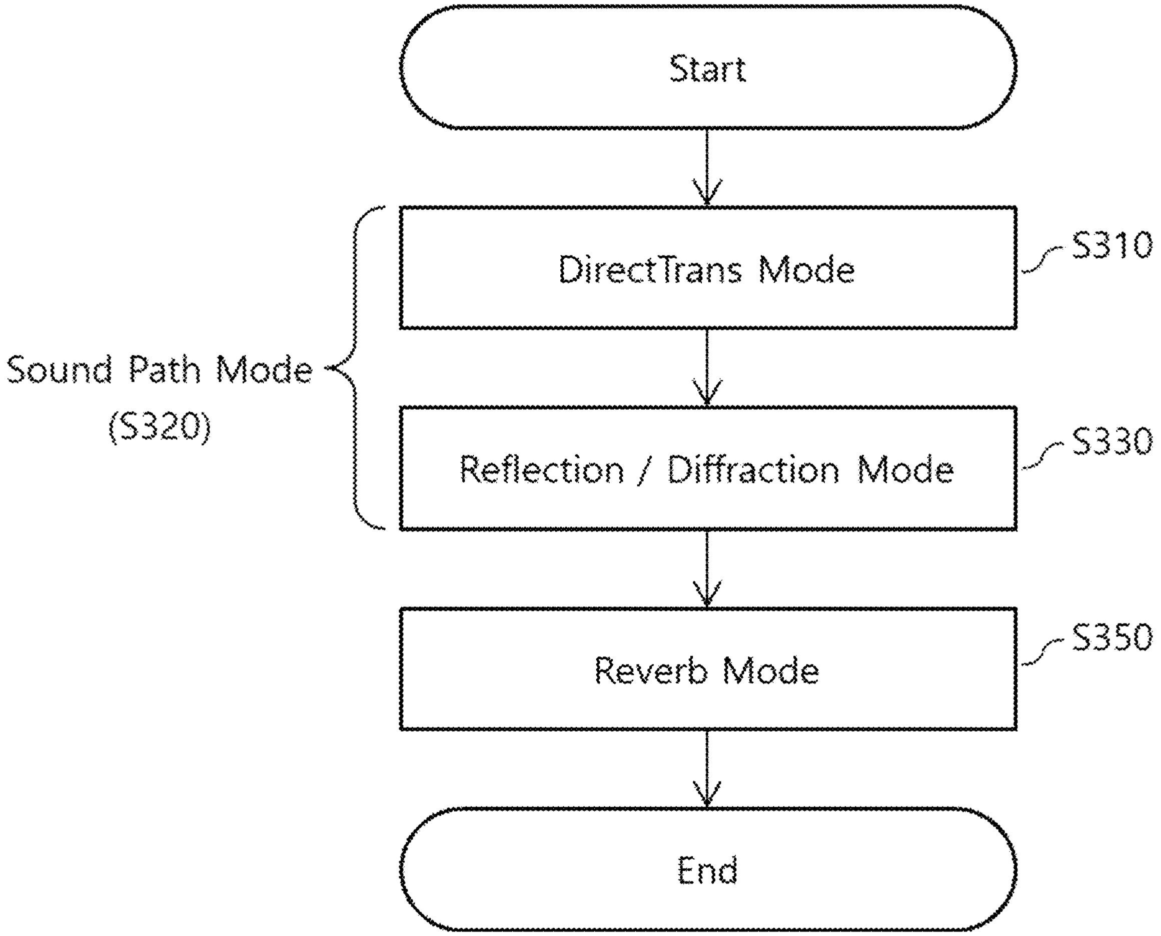
FIG. 3 is a diagram for describing a mode transition of a conventional sound propagation unit.

FIG. 3 is a diagram for describing a mode transition of a conventional sound propagation unit.

Referring to FIG. 3, the conventional sound propagation unit (SPU) may operate sequentially according to direct transmission (DirectTrans), Reflection/diffraction, and reverb modes. A sound propagation unit (SPU) mode may be generally categorized into a sound path mode S320 and a reverb mode S350. The sound path mode S320 may include a direct transmission mode S310 to process a direct sound and a transmission sound and a reflection/diffraction mode S330 to process a reflection sound and a diffraction sound, and the reverb mode S350 may correspond to a mode to process a reverb sound.

The direct transmission mode S310 may correspond to a mode for generating a straight ray between the listener and the sound source and performing a test, and then distinguishing the direct sound and the transmission sound according to whether there is the obstruction. The reflection/ diffraction mode S330 may find an early reflection sound path. The early reflection sound path may include a reflection sound path and a diffraction sound path. The reverb mode S350 may be performed in a last step, and may find information for generating a late reverb sound.

Figure 4:
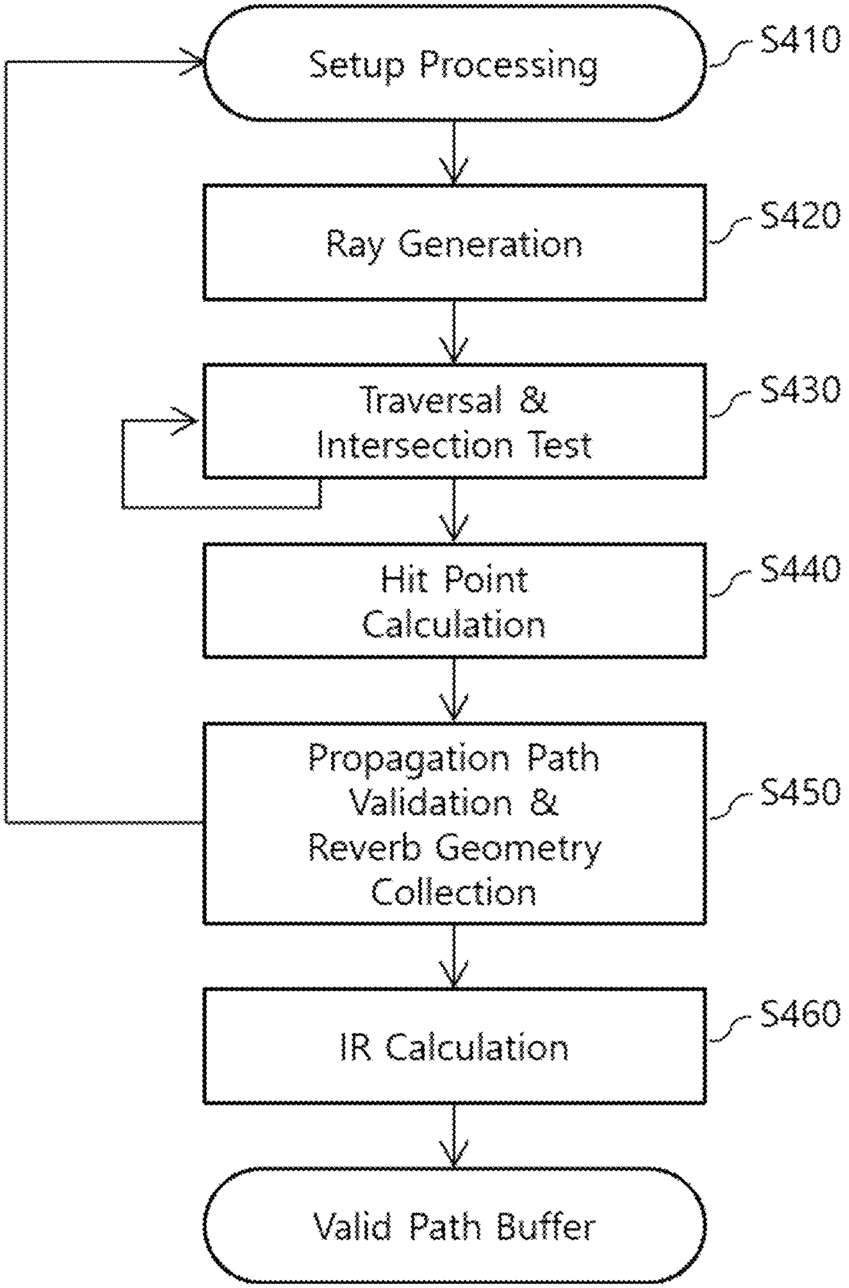
FIG. 4 is a diagram for describing a conventional sound propagation processing process.

FIG. 4 is a diagram for describing a conventional sound propagation processing process.

Referring to FIG. 4, a setup processing step S410 may correspond to a step of controlling the transition of the sound propagation unit (SPU) mode, and setting information required for generating guide ray information generated from the listener and reverb ray information generated from the sound source for a visibility test. After setting is completed, one of the guide ray or reverb ray information generated in the setup processing step S410 itself and reflection ray information generated via a PPV S450 may be selected according to the sound propagation unit (SPU) mode and sent to a ray generation step S420.

In the ray generation step S420, the corresponding ray may be generated based on the ray information generated in the setup processing step S410, and an origin and a direction of the ray may be calculated. The generated ray may be stored in a TnI input buffer which is a space in which input data for a traversal/intersection test is stored.

In the traversal/intersection test (TnI) step S430, the ray generated from the ray generation step S420 may be read from a TnI input buffer and it may be examined whether there is a triangle which hits the ray in an acceleration structure. For the hitting examination, a TnI unit may repeatedly perform a traversal for the acceleration structure and a ray-triangle intersection test. A distinguishing result of the TnI unit may be stored in the TnI output buffer.

In a hit point calculation step S440, an intersection point between the ray and the geometry may be calculated based on the result transferred from the TnI output buffer. When the ray is hit, triangle info. Data regarding a hit triangle ID may be requested. The calculated result and hit triangle info. Data may be transferred to perform the PPVnRGC (S450).

The PPVnRGC step S450 as a core functional block of performing a sound propagation simulation may determine whether to perform an early reflection sound path test or whether to perform a reverb geometry collection according to a ray feature of the transferred data. The PPVnRGC step S450 may be constituted by a propagation path validator (PPV) and a reverb geometry collector (RGC).

The PPV step is a step of performing a search of the direct, transmission, reflection, and diffraction sound paths. Typically, the PPV may use a uniform theory diffraction method (UTD) to find the diffraction sound path, and use an image source method to find the reflection sound path. If the direct sound path, the transmission sound path, the diffraction sound path, or the reflection sound path is found, the PPV may generate information required for an impulse response calculation and transfer the generated information to an IR calculator.

The RGC may use reverb geometry information required for calculating a reverb time. The reverb time as an important element for generating a natural reverb sound may generally use a statistical sound model in order to calculate the reverb time. Among them, an Eyring model as a model of calculating energy decay in a single space is widely used for speed and simplicity. For calculating the reverb time, a valid path triangle found through the propagation path test in information on the triangle which hits the guide ray and a reverb triangle which is information on a hit triangle found by the reverb ray may be used.

In this case, since the reverb may not be calculated if all path triangles are not generated, the sound path mode may be repeatedly performed until all information on the path triangle is generated. When the information on the path triangle and the reverb triangle is prepared, sorting may be performed in order to efficiently and quickly perform removal of a triangle redundant in the path triangle and the reverb triangle, and comparison of path triangle and reverb triangle IDs. The IDs of the sorted path triangle and reverb triangle are compared to find a triangle for the same ID and calculate valid reverb information. Calculated valid reverb data may be transferred to the IR calculator.

Finally, in an IR calculation step S460, an impulse response (IP) or a reverb IR of the valid direct/transmission, reflection, and diffraction paths processed from the PPVnRGC step S450 may be calculated and stored in the valid path buffer. When path data is stored in the valid path buffer, performing the sound propagation for a current frame may be completed and sent to the auralization processing step.

Figure 5:
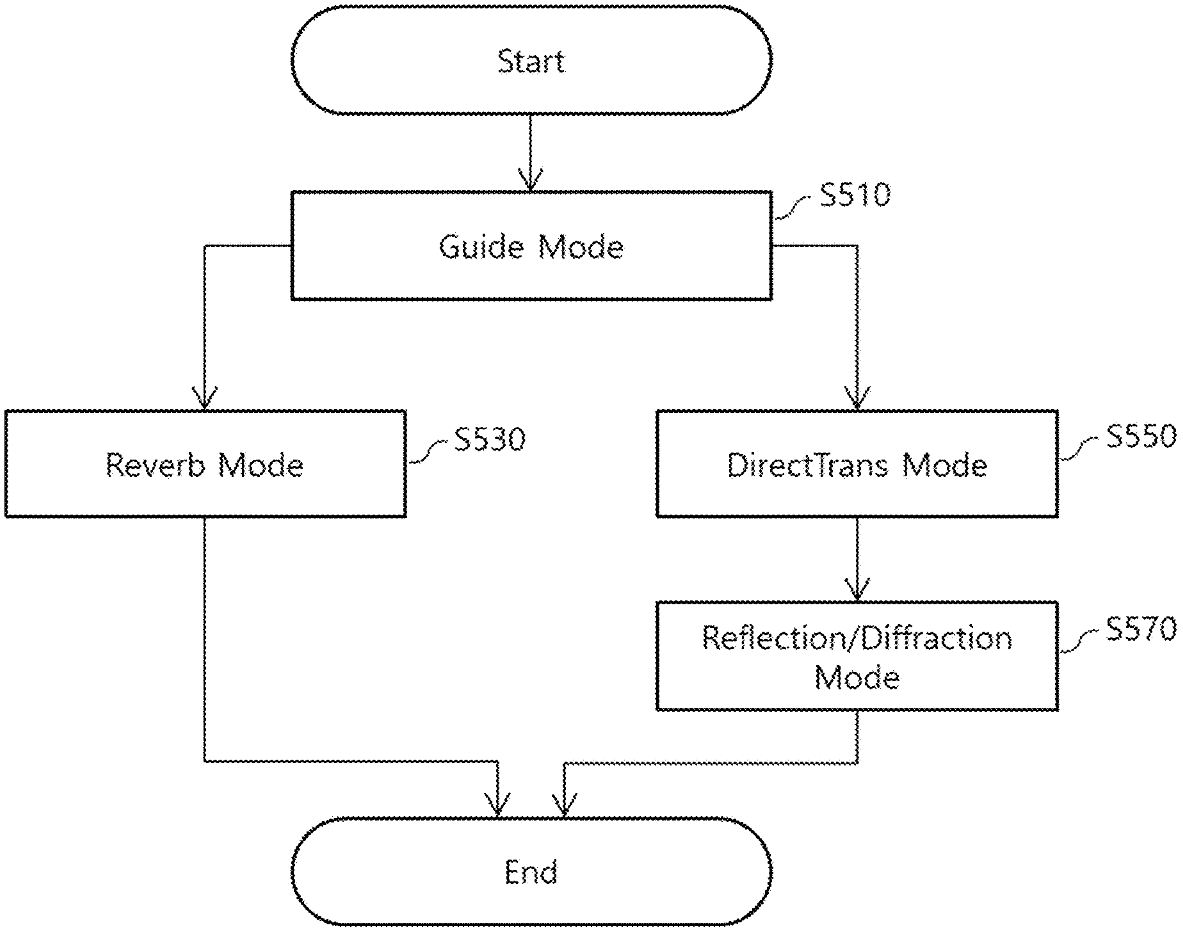
FIG. 5 is a diagram for describing a mode transition of a sound propagation unit according to the present invention.

FIG. 5 is a diagram for describing a mode transition of a sound propagation unit according to the present invention.

Referring to FIG. 5, in the sound tracing method according to the present invention, required information for all respective rays generated from the listener may be previously generated in the guide mode S510 so as to enable the sound path mode and the reverb mode S530 to be performed in parallel. Sound tracing hardware in which the sound tracing method according to the present invention is performed may be implemented to have a structure in which both modes are simultaneously performed based thereon. Through this, according to the present invention, it is possible to effectively improve a delay time generated as the sound path mode is repeatedly performed in order to generate the data required for calculating the reverb time in the conventional sound propagation algorithm.

In FIG. 5, the sound propagation unit mode according to the present invention may be constituted by four modes such as guide, reverb, direct transmission, and reflection/diffraction. The guide mode S510 may correspond to a mode of generating plane information required for performing the sound path mode and the reverb mode S530, and the reverb mode S530 may correspond to a mode of processing the reverb sound by using the information generated in the guide mode S510. The direct transmission mode S550 may correspond to a mode of processing the direct sound and the transmission sound, and the reflection/diffraction mode S570 may correspond to a mode of processing the reflection sound and the diffraction sound. The direct transmission mode S550 and the reflection/diffraction mode S570 may be performed by the same method as the conventional sound propagation algorithm.

Figure 6:
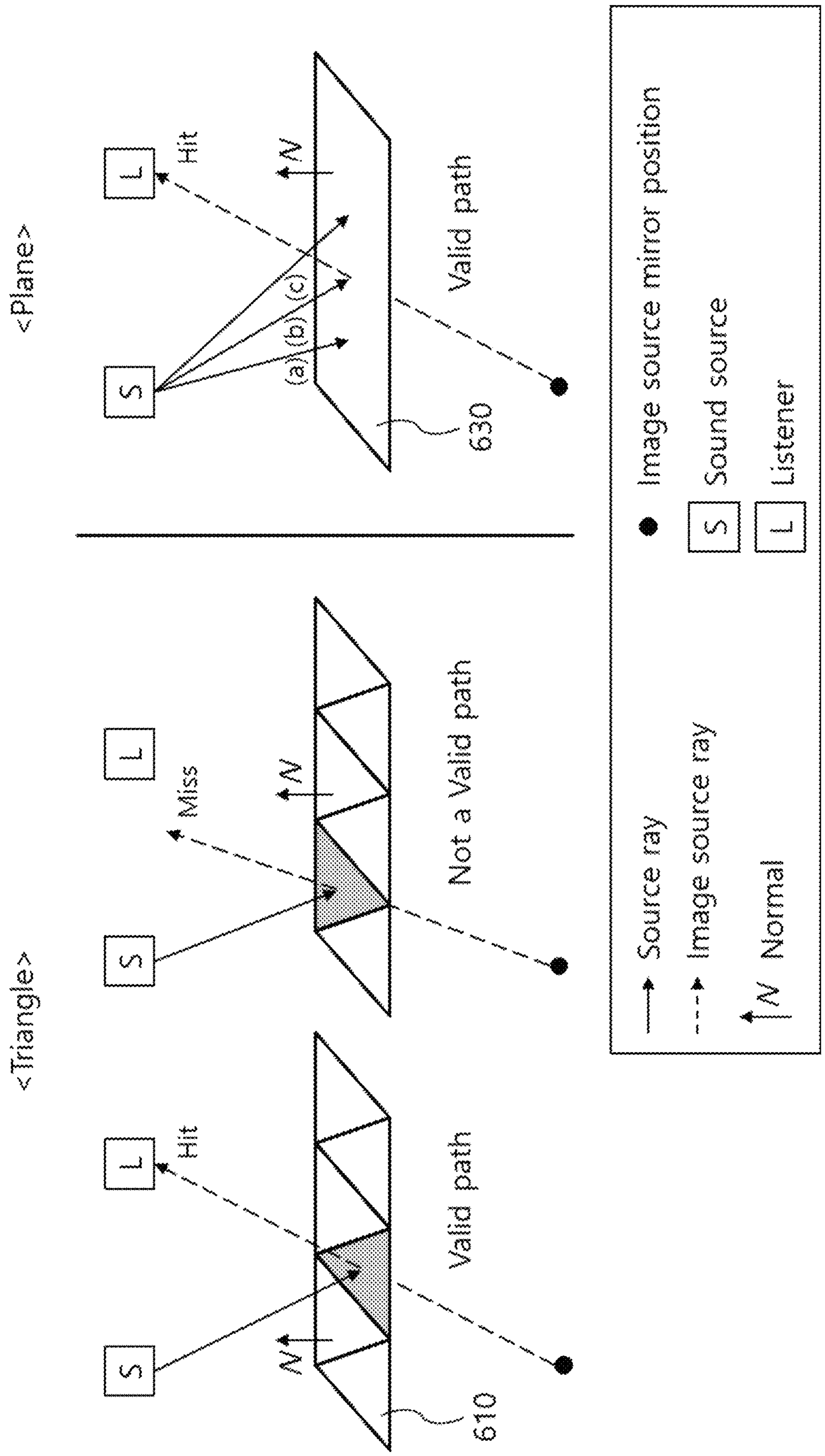
FIG. 6 is a diagram for describing a plane based valid path search according to the present invention.

FIG. 6 is a diagram for describing a plane based valid path search according to the present invention.

Referring to FIG. 6, the conventional sound propagation algorithm may use information based on a triangle 610 for searching a valid path, while the sound tracing method according to the present invention may use information based on a plane 630 other than the triangle 610. In FIG. 6, a difference between a valid path search method based on the triangle 610 and a valid path search method based on the plane 630 may be checked. In the case of the valid path search method based on the triangle 610, image source mirror positions of respective adjacent triangles having the same normal information as the hit triangle may be different.

As a result, in spite of adjacent triangles having the same normal information, a hitting result of an image source ray generated from the mirror position and the listener may be different. Unlike this, when using the information based on the plane 630, since one plane 630 including adjacent triangles having the same normal information as the hit triangle is generated, the adjacent triangles may have the same mirror position. Therefore, even though the ray hits any portion on the plane 630, the valid path may be searched.

For example, in a figure based on the plane 630 of FIG. 6, the plane 630 may find the valid path even though the plane 630 hits any source ray of (a), (b), and (c). In particular, when the number of sample rays of searching the valid search is small, a method using the information based on the plane 630 may be significantly advantages for the path search. Therefore, since the plane (630) based search method finds more valid paths than the existing triangle (610) based method, the proposed sound tracing method according to the present invention may use the information based on the plane 630.

More specifically, the guide mode may be performed based on the guide ray generated from the listener in order to generate the plane information required for performing the sound path mode and the reverb mode. A guide plane may be generated from the hit triangles by tracing the generated guide ray, and stored in a plane buffer. The guide plane may be generated by comparing and examining whether the triangles have the same normal value in the PPV step. Redundant planes in the guide plane stored in the plane buffer may reduce a data amount which is removed and transmitted by performing sorting.

The reverb mode may generate a reverb plane by tracking the reverb ray, and remove redundant planes by performing the sorting. The reverb plane and the guide plane which are redundantly removed may be compared and used for determining the same planes and calculating a reverb impulse response.

Figure 7:
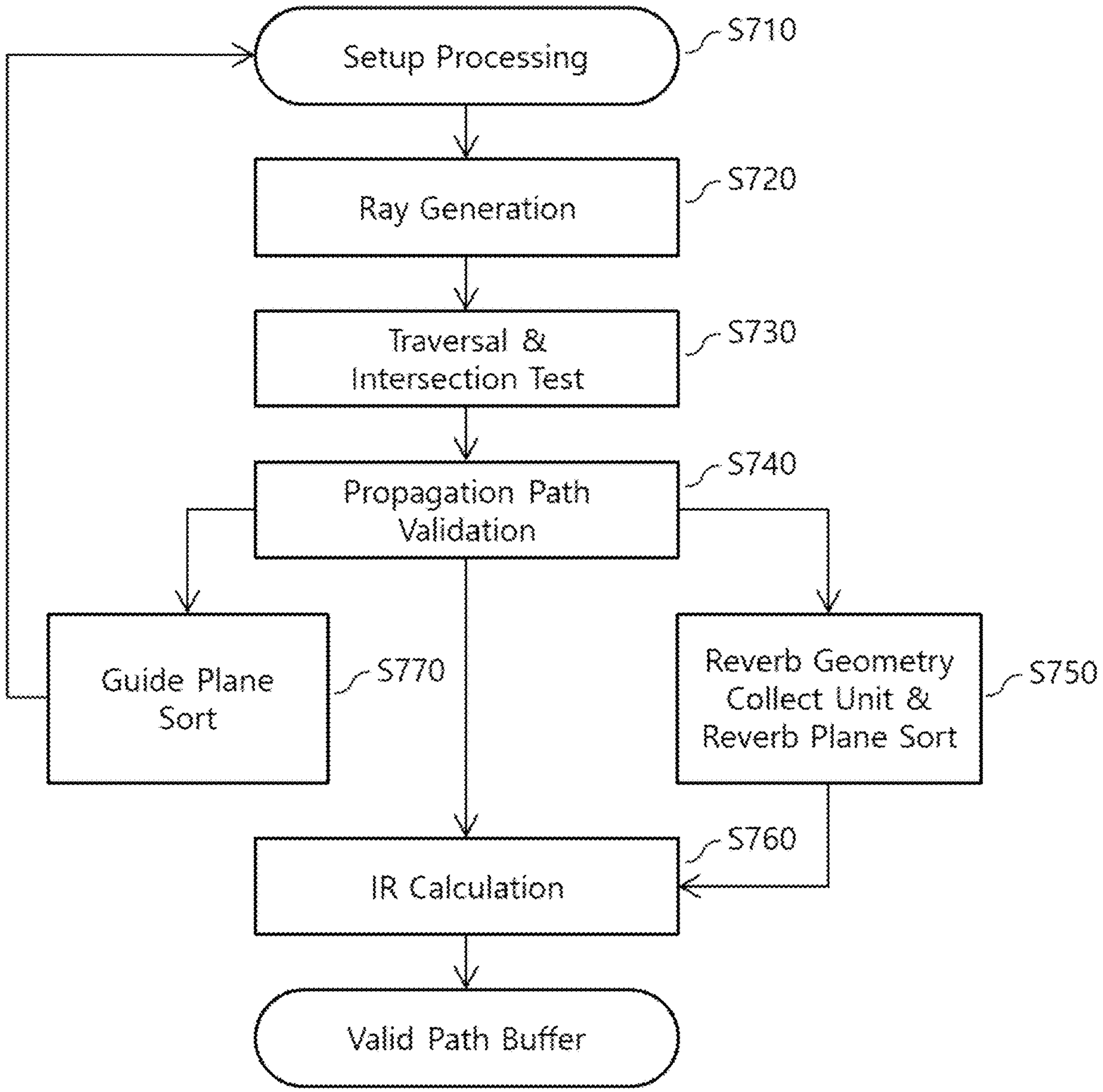
FIG. 7 is a diagram for describing a sound propagation processing process according to the present invention.

FIG. 7 is a diagram for describing a sound propagation processing process according to the present invention.

Referring to FIG. 7, the sound tracing method according to the present invention may use the sound propagation algorithm for performing the sound path mode and the reverb mode of the sound propagation unit in parallel. More specifically, the sound propagation algorithm may include a setup processing step S710, a ray generation step S720, a traversal and intersection step S730, a propagation path validation step S740, a reverb processing step S750, an impulse response calculation step S760, and a guide plane sorting step S770.

The setup processing step S710 may correspond to a step of controlling a mode transition of the sound propagation unit (SPU), and setting information required for generating the ray. After setting is completed, any one of guide ray information or reverb ray information generated in the setup processing step S710 itself, and reflection ray information generated through the PPV may be selected according to the sound propagation unit (SPU) mode, and transferred to the ray generation step S720.

In the ray generation step S720, a task of generating the ray may be performed by calculating an origin and a direction of the ray based on information received from the setup processing step S710. The ray generated in the ray generation step S720 may be transferred to the traversal and interaction test step S730.

That is, a traversal and intersection test may be performed for the acceleration architecture based on the ray generated in the traversal and interaction step S730. A result calculated by performing an intersection test and information data of the hit triangle are transferred to the propagation path validation (PPV) step S740.

In the propagation path validation (PPV) step S740, a task of searching the direct sound path, the transmission sound path, the reflection sound path, and the diffraction sound path may be performed. Upon performing the PPV, if the SPU mode is set to the sound path mode, the IR calculation step S760 may be performed in order to calculate the IRs of the valid direct direct/transmission, reflection, and diffraction paths found through the propagation path test. If the SPU mode is the reverb mode, reverb geometry collect unit and reverb plane sort (RGCnRPS) may be performed in order to calculate the valid reverb information (S750), and if the SPU mode is the guide mode, the guide plane sorting step S770 of generating and sorting the guide plane based on information on all triangles hit through performing the TnI S730 may be performed.

In the RGCnRPS step S750, the reverb plane may be generated by tracking the reverb ray in order to perform the reverb mode. The generated reverb plane may perform a sorting operation in order to remove the redundant plane, and quickly and efficiently compare the guide plane and the reverb plane IDs. Plane IDs are compared based on the sorted reverb plane information and the guide plane information generated through the guide mode to calculate the valid reverb information for the same plane. The calculated valid reverb information may be transmitted to the IR calculator for the reverb impulse response calculation S760.

Finally, in the IR calculation step S760, the impulse response (IR) of the valid direct/transmission, reflection, and diffraction paths processed from the PPV S740 may be calculated and the valid reverb IR processed in the stored in the RGCnRPS S750 and stored in the valid path buffer. When path data is stored in the valid path buffer, the performing of the sound propagation for the current frame may be completed.

Figure 8:
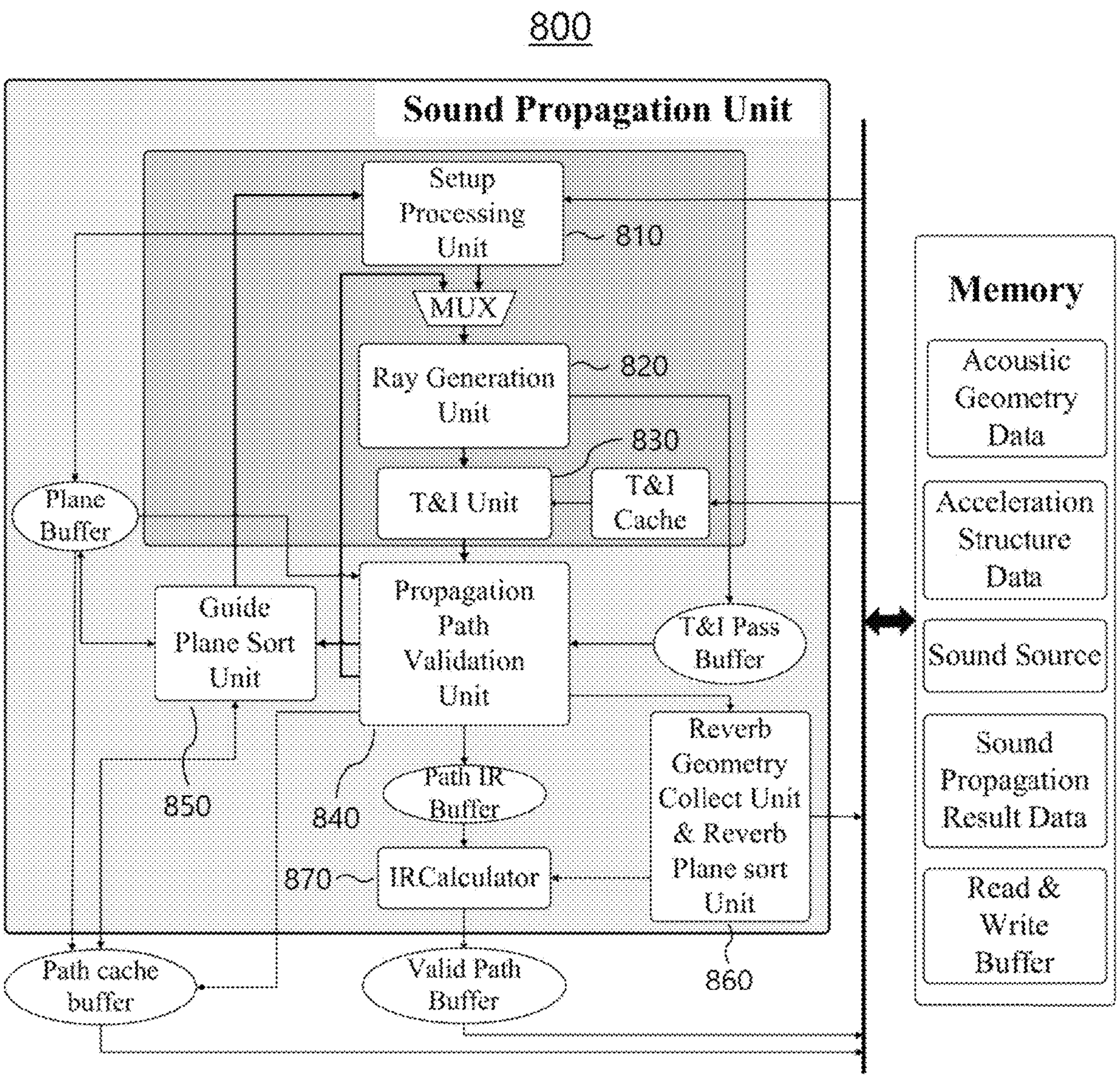
FIG. 8 is a diagram for describing a hardware configuration of a sound propagation unit according to the present invention.

FIG. 8 is a diagram for describing a hardware configuration of a sound propagation unit according to the present invention.

Referring to FIG. 8, a sound tracking device 800 may be implemented in hardware architecture in which the sound tracing method according to the present invention is capable of operating. The sound tracing method according to the present invention may be differentiated from the conventional sound propagation algorithm in the processing process according to the sound path mode and the reverb mode.

That is, in the conventional algorithm, the PPVnRGC as a core step of performing the sound propagation simulation may perform reverb geometry collection for finding the reflection and diffraction paths or performing reverb according to the ray feature of the transferred data. Due to the feature of the conventional algorithm, since reverb can be processed only when all path triangles should be generated through repeatedly performing the sound path mode, the PPV and RGC units may be formed only in integrated architecture.

Unlike this, in the hardware architecture of the sound propagation unit (SPU) according to the present invention, since the algorithm is improved so as to enable the sound path mode and the reverb mode to be independently performed, PPV 840 and RGC 860 may form architecture of being separated into completely independent units. As a result, the sound path mode and the reverb mode may be performed in parallel according to the feature of the ray received by the PPV 840.

A data path of the sound propagation unit (SPU) hardware according to the present invention may be constituted by a device that performs a path tracking algorithm and a device that performs sound propagation processing. A path tracing section may be constituted by a setup processing unit 810, a ray generation unit 820, and a TnI unit 830. A sound propagation processing section may be constituted by a propagation path validation unit 840, a guide plane sort unit (GPS) 850, a reverb geometry collect unit and reverb plane sort unit (RGCnRPS) 860, and an IR calculator 870.

A memory may be constituted by a TnI cache memory, an IR buffer, a TnI pass buffer, a next frame buffer, a valid path buffer, and an external memory. The external memory may be constituted by acoustic geometry data, geometry data, acceleration structure (AS) data, sound source data, sound propagation result data, etc.

The TnI cache memory may store information for the traversal and intersection test, and the setup cache memory may store information for setup processing. The path IR buffer may store impulse response values of the direct/transmission, reflection, and diffraction paths, and the next frame buffer may store validation paths found in the PPV step of the current to be used for a next frame. The plane buffer may store the planes generated in the guide mode, and the TnI pass buffer may store information of rays which need not pass through the TnI step. The valid path buffer may store the IR values calculated in the validation path and the IR calculator. Last, the external memory may be constituted by acoustic geometry data, an acceleration structure, a sound source, sound propagation result data, and a read and write buffer.

The SPU hardware according to the present invention may operate according to the following processing flow. First, the setup processing unit 810 may correspond to a unit that sets information required for generating the ray, and select the information of the ray according to the SPU mode and transmit the selected the ray information to the ray generation unit 820.

The ray generation unit 820 may generate a ray by calculating the origin and the direction by using the information received from the setup processing unit 810, and transmit the generated ray to the TnI unit 830. More specifically, the ray generation unit 820 may generate each ray according to an operation mode.

For example, in the case of the guide mode or the reverb mode, the ray may be generated from each listener or the sound source by using a spherical sampling scheme. In the case of the direct mode, the direct ray from the listener may be generated from the sound source, and the ray for transmission may be generated according to a material or a depth of an object. In the case of the reflection mode, a validation ray may be generated by using a mirror position of a setup plane for reflection. In the case of the diffraction mode, the ray may be generated based on an edge point of the setup plane. If an edge capable of performing the diffraction is found, the diffraction ray may be generated based on the corresponding edge.

The TnI unit 830 repeatedly performs the traversal and intersection test for the acceleration structure to test whether the ray generated by the ray generation unit 820 has a triangle intersected in the acceleration structure. When the hit occurs according to an intersection result, triangle information data for a hit triangle ID may be requested. The calculated result and the hit triangle information data may be transmitted to the PPV unit 840.

The PPV unit 840 may correspond to a unit that finds the direct, transmission, reflection, and the diffraction sound paths. Further, the PPV unit 840 may determine whether the path is valid by using the setup plane calculated by the setup processing unit 810. If the SPU mode is set to the sound path mode, an output of the PPV unit 840 may be transmitted to the IR calculator 870, and transmitted to the RGCnRPS unit 860 in the reverb mode. If the SPU mode is the guide mode, the guide plane generated by the PPV unit 840 may be transferred to the GPS unit 850, and a redundant plane may be removed through sort performing.

In the RGCnRPS unit 860, when the reverb plane is generated by tracking the reverb ray, the redundant reverb plane may be removed through sort performing. After sort performing, the reverb time may be calculated to calculate valid reverb information, and the valid reverb information may be transmitted to the IR calculator 870. The RGC unit may collect planes generated through the guide ray and the reverb ray, and the RPS unit may perform sorting and IR information generation for the stored planes. The RGC unit may store a maximum of 28,672 (1024 (guide ray count)*4 (depth)*frame (7)) planes generated through the guide ray and a maximum of 3,584 (reverb ray count (128)*depth (4)*frame (7)) planes generated through the reverb ray for each sound source. The RPS unit may perform merge sort for the planes generated for each sound source. In this case, when sorting all planes is completed, reverb IR information may be generated by using a guide plane sequence and a reverb plane sequence which are sorted.

The IR calculator 870 may generate path/reverb sound rendering information data by using IR generation information received by the PPV unit 840 and the RGCnRPS unit 860. That is, the IR calculator 870 may calculate a final IR by receiving a sound ID, a type, a direction and a length of the ray, etc., through valid path information. Generated data may be stored in the valid path buffer, and last recorded in the external memory. Through the processing process, the SPU hardware according to the present invention may complete the sound propagation operation for the current frame.

Figure 9:
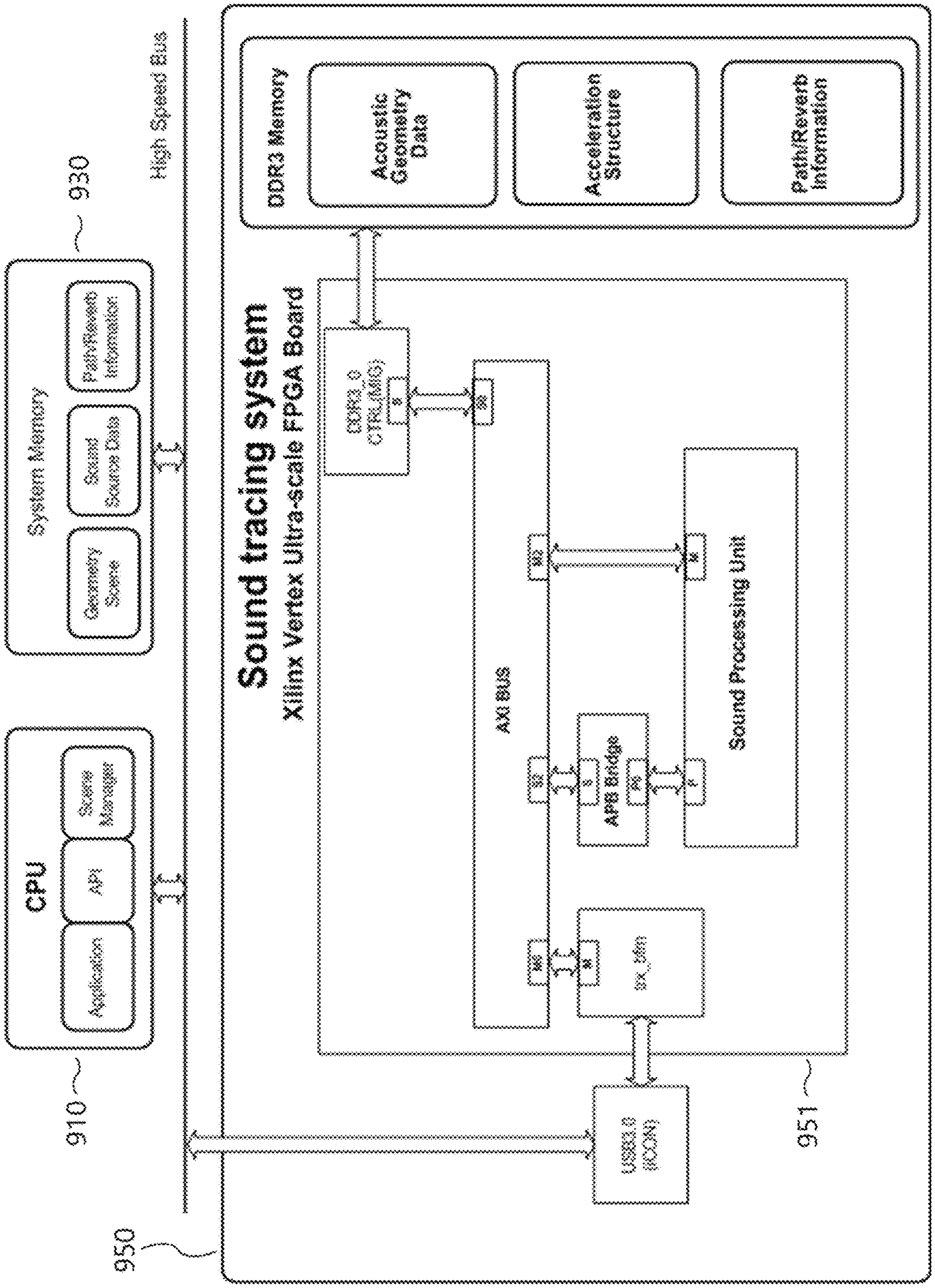
FIG. 9 is a diagram for describing a system in which sound tracing hardware is configured by a board according to the present invention.

FIG. 9 is a diagram for describing a system in which the sound tracing device is configured by a board according to the present invention.

Referring to FIG. 9, an embodiment of an FPGA prototype implementing a Xilinx FPGA board 950 may be verified based on hardware architecture according to the present invention. The FPGA prototype may operate according to the processing flow. First, acceleration structure geometry information may be transmitted to an external memory 930 of the FPGA board 950 from the CPU 910 through an FMC board. After transmission is completed, the CPU 910 may transmit sound source and listener information, ray information, material information of a surrounding object, and SPU register setting information to an internal memory of an SPU 951.

After register setting of the SPU 951, sound propagation may be performed with current frame information stored in the internal memory. Then, the sound propagation for the current frame may be completed, and a path found through the simulation may be stored in the valid path buffer. Thereafter, the valid path buffer may transmit the reverb information to the external memory 930 of the FPGA board 950 jointly with the stored valid path.

When all information of the current frame is transmitted to the external memory 930, the sound propagation unit 951 may notify that the sound propagation for the current frame is completed to the CPU 910. Last, the CPU 910 receives the valid path and the reverb data stored in the external memory 930 of the FPGA board 950 through the FMC board to perform software based auralization. A host (PC) may a finial sound generated by auralization SW to a sound output device and output the sound.

Figure 10:
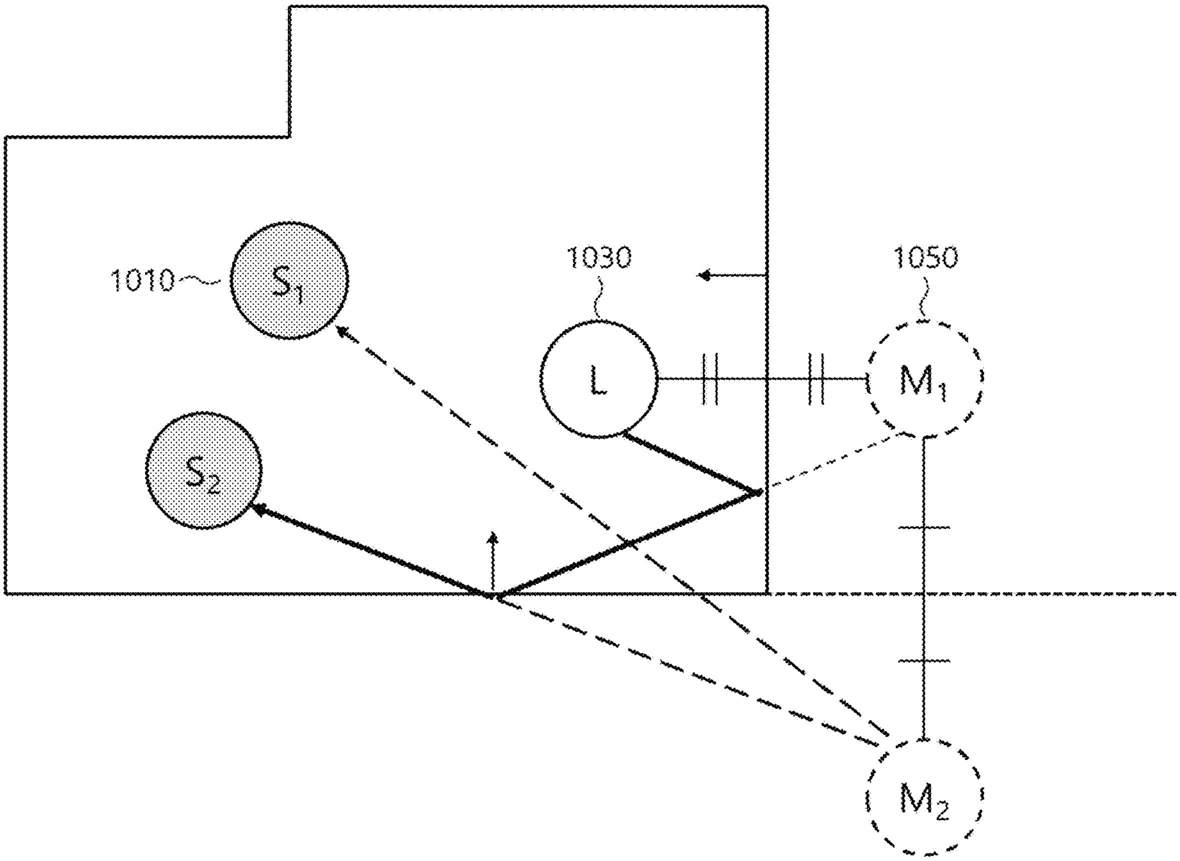
FIG. 10 is a diagram for describing an image source technique according to the present invention.

FIG. 10 is a diagram for describing an image source technique according to the present invention.

Referring to FIG. 10, the sound tracing method according to the present invention may determine whether the path is valid by using the setup plane calculated by the setup processing unit through the propagation penalty validation (PPV) unit. In this case, a path for determining whether the path is valid may include the direction/transmission path, the reflection path, and the diffraction path.

In the case of FIG. 10, an image source method for a validation test of the reflection path may be illustrated. Here, L may correspond to a listener 1030, $S_1$ and $S_2$ may correspond to a sound source 1010, and $M_1$ and $M_2$ may correspond to a listener mirror position 1050. The listener mirror position 1050 may be set to a normal mirror direction (opposite direction) of the setup plane hit from the listener 1030 or the listener mirror position 1050.

More specifically, validation of the reflection path may be performed through the following process. First, a validation ray may be shot toward the sound source $S_1$ and $S_2$ 1010 from the mirror $M_2$ 1050 set last. If the validation ray hits the setup plane used for setting $M_2$, it may be determined that there is the valid path for $M_2$ up to the sound source 1010 from the setup plane and if not, it may be determined that there is no valid path (reject). When validation for $M_2$ is ended, validation for $M_1$ may be performed by shooting the validation ray to the setup plane hit in $M_2$ from $M_1$. Likewise, it may be examined whether the validation ray hits the setup plane used when setting $M_1$. The validation may be repeatedly performed until the validation ray is shot from the listener 1030.

The sound tracing method according to the present invention may search more valid paths by using the plane other than the triangle. In this case, the validation path may be searched by examining whether the validation ray and the listener probe ray hit the same plane. When the plane is used, since the plane has a larger area than the triangle, more valid paths may be found probabilistically when performing the validation for each sound source.

Figure 11:
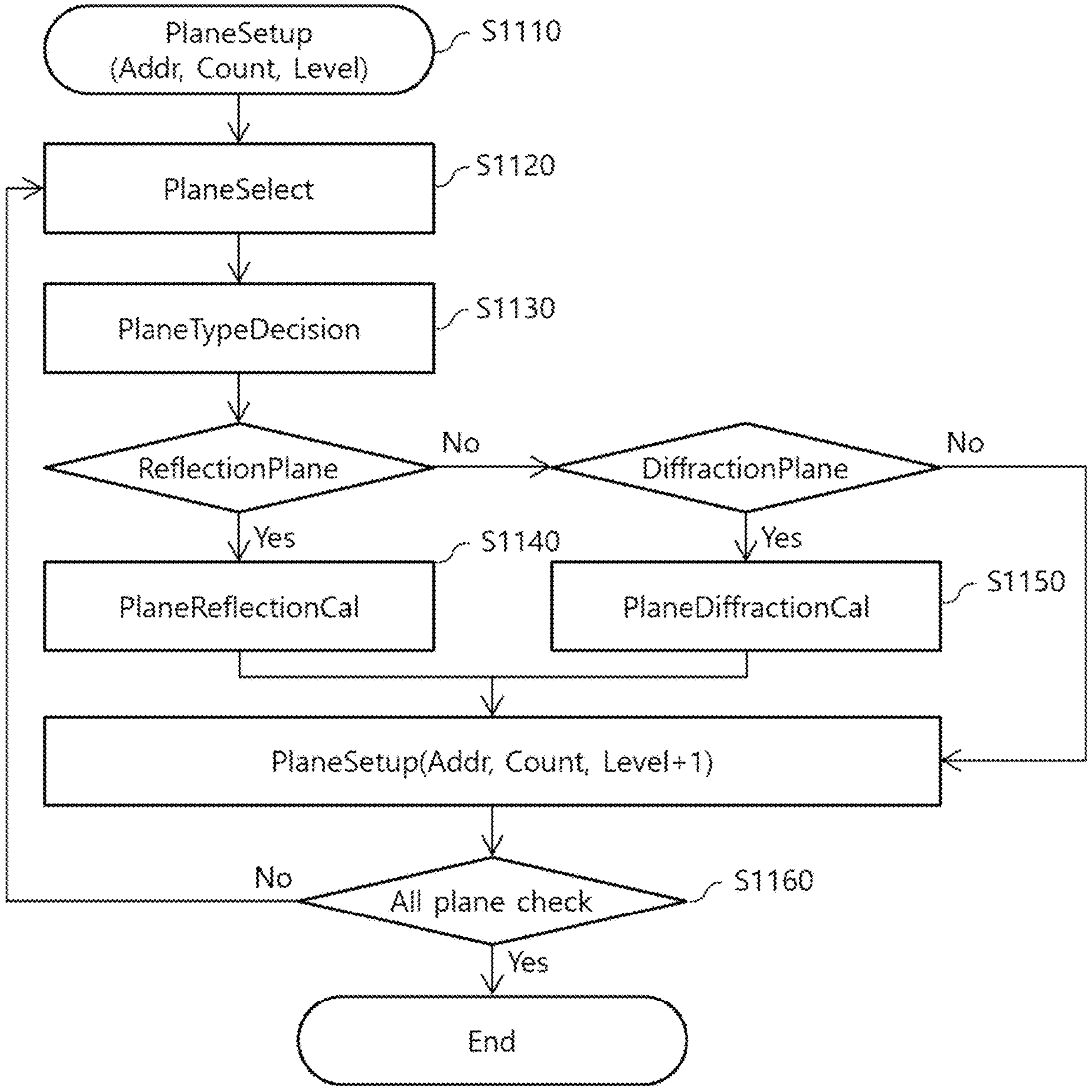
FIG. 11 is a diagram for describing a plane set-up operation according to the present invention.

FIG. 11 is a diagram for describing a plane set-up operation according to the present invention.

Referring to FIG. 11, a sound tracing device 800 according to the present invention may perform a plane setup operation S1110 through a setup processing unit 810. The plane setup operation S1110 may correspond to an operation of generating a setup plane required for performing the reflection/diffraction mode.

First, in a plane select step S1120, a task of selecting any one of a guide plane and a plane of a next frame buffer may be performed. More specifically, in the plane selection step S1120, it may be verified whether the guide plane of the current frame stored in the plane buffer is present in the next frame buffer. Here, the next frame buffer may store a valid plane sequence of a previous frame as a path cache buffer.

If a plane of the same information as the guide plane of the current frame is present in the next frame buffer, the plane of the next frame buffer may be selected and reused and if not, the guide plane of the current frame may be selected and used.

A plane type decision step S1130 may decide whether the selected guide plane is a reflection plane or a diffraction plane.

More specifically, guide plane normal may be set based on facing the listener. The reason is that the position of the listener is flexible, and as a result, a reflection/diffraction effect is decided. A guide plane deciding operation may be made by a newly set plane normal. If the guide plane normal faces the sound source, the corresponding plane may be decided as the reflection plane and in an opposite case, the corresponding plane may be decided as the diffraction plane. For guide planes of which types are decided, the plane calculation suitable for each corresponding type is performed to generate the setup plane (S1140 and S1150). Such a task may be recursively repeatedly performed until a maxim depth is satisfied for all guide planes (S1160).

In the sound tracking method and device according to the present invention, propagation path validation of finding the direct/transmission, diffraction, and reflection sound paths and reverb geometry collection of calculating reverb geometry information for calculating the reverb time may have architecture of being separated into independent units so as to simultaneously perform the sound path mode and the reverb mode.

Further, in the existing algorithm, information of the triangle is used for the sound propagation processing, but in the algorithm according to the present invention, information of the plane other than the triangle may be used. When adjacent triangles having the same normal information as the hit triangle are calculated by one same plane at the time of searching the valid path, a hit ratio is higher than that in the existing triangle scheme, so more valid paths may be acquired. In particular, as the number of rays generated from the listener and the sound source is small, the valid path search of the plane scheme may be even more efficient than that the triangle scheme.

Based thereon, the sound propagation scheme according to the present invention may perform the guide mode through the ray (i.e., guide ray) generated from the listener in order to independently perform the sound path mode and the reverb mode. The traversal and intersection test is performed for each of all rays generated from the listener in the guide mode unlike the existing scheme to first generate the guide plane. Since all guide planes are first generated unlike the existing scheme, each of the sound path mode and the reverb mode may be independently performed.

Consequently, according to the present invention, as compared with the existing scheme, since a delay time of waiting for generating the path triangle that performs the propagation path test of the sound path mode to calculate the reverb is not generated, a sound propagation speed may be enhanced. Further, according to the present invention, real-time processing is enabled at a high speed in a complicated scene requiring a large calculation amount due to an increase of the sound propagation speed and a 3D sound including a very realistic reverb effect may be provided to the user.

The present invention has been described with reference to the preferred embodiments of the present invention, but those skilled in the art will understand that the present invention can be variously modified and changed without departing from the spirit and the scope of the present invention which are defined in the appended claims.

[Description of Reference Characters]

| | |
|---|---|
| 610: triangle | 630: plane |
| 800: sound tracking device | 820: ray generation unit |
| 810: setup processing unit | 840: propagation path validation unit |
| 830: TnI unit | 860: reverb geometry collect unit and reverb plane sort unit |
| 850: a guide plane sort unit | |
| 870: IR calculator | 930: external memory |

-continued

| [Description of Reference Characters] | |
|---|---|
| 910: CPU | 951: SPU |
| 950: FPGA board | 1030: listener |
| 1010: sound source | |
| 1050: listener mirror position | |

What is claimed is:

1. A sound tracing method to improve sound propagation performance, the method comprising:

a setup processing step of controlling a mode transition of a sound propagation unit (SPU) and setting ray information for generating a sound ray;

a ray generation step of generating the sound ray by calculating an origin and a direction based on the ray information;

a traversal/intersection test step of performing a traversal/intersection test on an acceleration structure (AS) based on the sound ray to generate hit triangle information;

a propagation path validation (PPV) step of searching a sound path according to a mode of the sound propagation unit;

a guide plane sort step of generating and sorting a guide plane based on the hit triangle information when the mode of the sound propagation unit is a guide mode;

a Reverb Geometry Collect/Reverb Plane Sort (RGC/RPS) step of generating and sorting a reverb plane by tracking a reverb ray generated as the sound ray when the mode of the sound propagation unit is a reverb mode; and an impulse response calculation step of calculating an impulse response (IR) of the sound path or a reverb impulse response (IR) based on information received in the propagation path validation step or the reverb processing step, and storing the calculated IR or reverb IR in a valid path buffer.

2. The sound tracing method of claim 1, wherein the mode of the sound propagation unit is transited to the reverb mode or a sound path mode from the guide mode, and the modes are performed in parallel.

3. The sound tracing method of claim 2, wherein the sound path mode is formed by sequentially concatenating a direct transmission mode and a reflection/diffraction mode.

4. The sound tracing method of claim 1, wherein the setup processing step includes a step of transferring any one of guide ray information and reverb ray information and reflection ray information received from the propagation path validation (PPV) step to the ray generation step as the ray information according to the mode of the sound propagation unit.

5. The sound tracing method of claim 4, wherein the ray generation step includes a step of generating the corresponding ray from a listener or a sound source based on the ray information by using a spherical sampling scheme when the mode of the sound propagation unit is the guide mode or the reverb mode.

6. The sound tracing method of claim 1, wherein the propagation path validation (PPV) step includes a step of determining valid direct/transmission, reflection, and diffraction paths through a propagation path test when the mode of the sound propagation unit is a sound path mode.

7. The sound tracing method of claim 6, wherein the propagation path validation (PPV) step includes a step of sequentially setting at least one listener mirror position symmetric to at least one setup plane based on a location of the listener or a listener mirror position, a step of shooting a validation ray toward a sound source from a listener mirror position set last, a step of determining a path up to the sound source from a setup plane as a valid path when the validation ray hits the setup plane used to set the listener mirror position, and a step of repeatedly performing the step of shooting the validation ray and the step of determining the valid path in a reverse order to a setting order of the at least one listener mirror position, and determining a valid reflection path repeatedly until the validation ray is shot at the location of the listener.

8. The sound tracing method of claim 1, wherein the guide plane sort step includes a step of generating one guide plane including triangles having the same normal information based on the hit triangle information.

9. The sound tracing method of claim 8, wherein the guide plane sort step includes a step of generating the guide plane based on the hit triangles and storing the generated guide plane in a plane buffer, and a step of sorting the guide plane of the plane buffer and removing redundancy.

10. The sound tracing method of claim 1, wherein the reverb processing step includes a step of generating valid reverb information based on the same planes by comparing plane IDs of the reverb plane and the guide plane.

11. A sound tracing device to improve sound propagation performance, the device comprising:

a setup processing unit controlling a transition of an operation mode and setting ray information for generating a sound ray;

a ray generation unit generating the sound ray by calculating an origin and a direction based on the ray information;

a traversal/intersection unit of performing a traversal/intersection test on an acceleration structure (AS) based on the sound ray to generate hit triangle information;

a propagation path validation (PPV) unit searching a sound path according to the operation mode;

a guide plane sort unit generating and sorting a guide plane based on the hit triangle information when the operation mode is a guide mode;

a Reverb Geometry Collect/Reverb Plane Sort (RGC/RPS) unit generating and sorting a reverb plane by tracking a reverb ray generated as the sound ray when the operation mode is a reverb mode; and an impulse response (IR) calculation unit calculating an impulse response (IR) of the sound path or a reverb impulse response (IR) based on information received from the propagation path validation unit or the reverb processing unit, and storing the IR and the reverb IR in a valid path buffer.

12. The sound tracing device of claim 11, further comprising:

a plane buffer receiving plane information from the setup processing unit and generated by the guide plane sort unit or storing sorted planes.

13. The sound tracing device of claim 11, wherein the operation mode is transited to the reverb mode or a sound path mode from the guide mode according to initiation of mode transition, wherein the sound path mode is formed by sequentially concatenating a direct transmission mode and a reflection/diffraction mode, and the reverb mode and the sound path mode are performed in parallel.

14. The sound tracing device of claim 11, wherein the setup processing unit generates a setup plane required for performing the reflection/diffraction mode through a plane setup operation.

15. The sound tracing device of claim 14, wherein the plane setup operation includes a plane select step of selecting any one of planes stored in a plane buffer and a next frame buffer, a plane type decision step of deciding whether the selected plane is a reflection plane or a diffraction plane, and a plane calculation step of performing a plane calculation according to the decided plane type to generate the setup plane.

16. The sound tracing device of claim 15, wherein the plane selection step includes a step of selecting the corresponding plane if the corresponding plane having the same information as the guide plane stored in the plane buffer is present in the next frame buffer and selecting the corresponding guide plane if not.

17. The sound tracing device of claim 15, wherein the plane type decision step includes a step of setting a guide plane normal according to a direction facing a listener for the selected plane, and a step of deciding the selected plane as the reflection plane when the guide plane normal faces a sound source, and deciding the selected plane as the diffraction plane in an opposite case.

* * * * *